United States Patent
Nagi (10) Patent No.: US 11,291,304 B1
(45) Date of Patent: Apr. 5, 2022

(54) SEATBACK AND HEADREST ASSEMBLY

(71) Applicant: Ford Global Technologies, LLC, Dearborn, MI (US)

(72) Inventor: Ranjit Nagi, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/221,574

(22) Filed: Apr. 2, 2021

(51) Int. Cl.
*B60N 2/835* (2018.01)
*B60N 2/42* (2006.01)
*A47C 7/38* (2006.01)

(52) U.S. Cl.
CPC . *A47C 7/38* (2013.01); *B60N 2/42* (2013.01)

(58) Field of Classification Search
CPC .......... B60N 2/80; B60N 2/806; B60N 2/809; B60N 2/832; B60N 2/838; B60N 2/841; B60N 2/865; B60N 2/812; B60N 2/853; B60N 2/856; B60N 2/862
See application file for complete search history.

(56) References Cited

U.S. PATENT DOCUMENTS

| | | | |
|---|---|---|---|
| 5,772,280 A * | 6/1998 | Massara | B60N 2/4214 297/216.12 |
| 6,962,392 B2 | 11/2005 | O'connor | |
| 7,008,019 B2 | 3/2006 | Lampke et al. | |
| 7,523,803 B2 * | 4/2009 | Breed | B60R 21/01516 297/217.3 |
| 8,123,292 B2 * | 2/2012 | Nishiura | B60N 2/888 297/216.12 |
| 8,616,625 B2 | 12/2013 | Buccinna | |
| 8,625,034 B2 * | 1/2014 | Campbell | B60K 37/06 348/836 |
| 8,899,685 B2 | 12/2014 | Haeske et al. | |
| 9,738,190 B2 | 8/2017 | Wagner et al. | |
| 10,518,680 B2 | 12/2019 | Chehade et al. | |
| 2005/0116515 A1 * | 6/2005 | Schlierf | B60N 2/809 297/216.12 |
| 2007/0085401 A1 | 4/2007 | Hunziker et al. | |
| 2007/0132300 A1 * | 6/2007 | Toba | B60N 2/859 297/408 |
| 2007/0135982 A1 * | 6/2007 | Breed | G01G 19/4142 701/36 |
| 2019/0184878 A1 * | 6/2019 | Milner | B60N 2/829 |

* cited by examiner

Primary Examiner — Shin H Kim
(74) Attorney, Agent, or Firm — Vichit Chea; Price Heneveld LLP (57) ABSTRACT

A seat assembly includes a seatback with a frame assembly. A track member is operably coupled to the frame assembly. A carriage member is pivotally and slideably coupled to the track member between raised and lowered positions. At least one support rod having upper and lower portions is operably coupled to the carriage member for movement therewith. A headrest assembly is supported on the upper portion of the at least one support rod and is operable between extended and retracted positions. The headrest assembly includes a headrest bun with a downwardly extending lower portion. The seatback includes a receiving area extending inwardly from a front side of the seatback and extending downwardly from an upper side of the seatback. A portion of the downwardly extending lower portion of the headrest assembly is received in the receiving area of the seatback when the headrest assembly is in the retracted position.

20 Claims, 7 Drawing Sheets

SEATBACK AND HEADREST ASSEMBLY

FIELD OF THE DISCLOSURE

The present invention generally relates to a headrest assembly, and more particularly to a headrest assembly supported on a seatback that telescopes and pivots with respect to the seatback as the headrest assembly is vertically adjusted.

BACKGROUND OF THE DISCLOSURE

Adjustable comfort settings for a headrest are desired. Often, a rear seating option is limited as to what type of adjustments can be made with an associated headrest assembly. The present invention provides a telescoping headrest assembly that pivots to align with a user, while maintaining a desired profile and functionality.

SUMMARY OF THE DISCLOSURE

According to one aspect of the present invention, a seat assembly includes a seatback having an interior portion with a frame assembly disposed therein. A track member is operably coupled to the frame assembly and includes a channel disposed along the track member. A carriage member is slideably coupled to the channel of the track member between raised and lowered positions. The carriage member includes a hollow interior cavity. A guide plate is pivotally coupled to the frame assembly between first and second positions. The guide plate includes at least one sleeve having an outer casing with a receiving channel disposed therethrough. At least one support rod includes upper and lower portions with a body portion disposed therebetween. The lower portion is received in the hollow interior cavity of the carriage member for movement therewith. The body portion is slideably received in the receiving channel of the guide plate. A headrest assembly is supported on the upper portion of the at least one support rod. The headrest assembly is operable between extended and retracted positions.

According to another aspect of the present invention, a seat assembly includes a seatback having an interior portion with a frame assembly disposed therein. A track member is operably coupled to the frame assembly. A carriage member is pivotally and slideably coupled to the track member between raised and lowered positions. At least one support rod includes upper and lower portions. The lower portion is operably coupled to the carriage member for movement therewith. A headrest assembly is supported on the upper portion of the at least one support rod, and is operable between extended and retracted positions.

According to another aspect of the present invention, a seat assembly includes a seatback having an interior portion with a frame assembly disposed therein. A track member is operably coupled to the frame assembly at a mounting angle. A support rod includes upper and lower portions. The lower portion is operably coupled to the track member for movement between raised and lowered positions. The support rod is disposed at a first angle relative to the mounting angle of the track member when the support rod is in the lowered position. The support rod is disposed at a second angle relative to the mounting angle of the track member when the support rod is in the raised position. The second angle is greater than the first angle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1A:
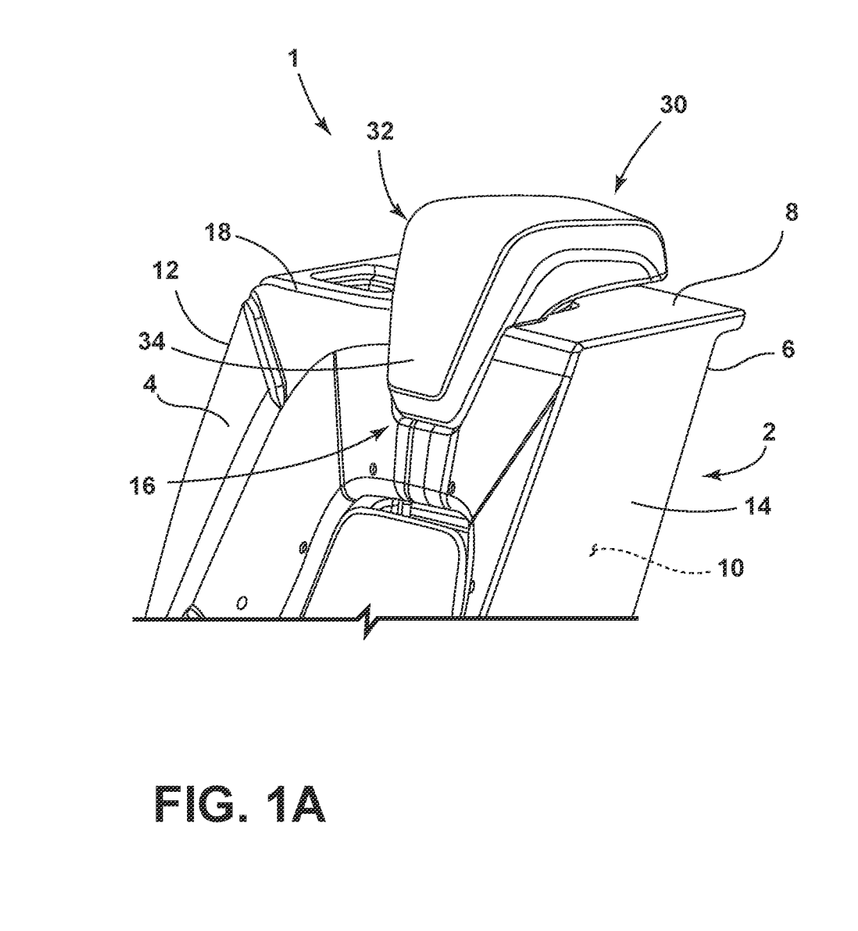
FIG. 1A is a fragmentary front perspective view of a seating assembly with a headrest assembly shown in a retracted position.

For purposes of description herein, the terms "upper," "lower," "right," "left," "rear," "front," "vertical," "horizontal," and derivatives thereof shall relate to the disclosure as oriented in FIG. 1A. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1A, a seat assembly 1 is shown having a seatback 2 with a headrest assembly 30 supported on the seatback 2. As shown in FIG. 1A, the seatback 2 includes a front side 4, a rear side 6, an upper side 8, and first and second sides 12, 14. The front side 4 and rear side 6 are opposed to one another, and the first and second sides 12, 14 are opposed to one another to define an interior portion 10 disposed therebetween. The seatback 2 further includes a receiving area 16 which is an inwardly disposed recess that is generally centrally disposed along an intersection 18 of the upper side 8 and the front side 4 of the seatback 2. As shown in FIG. 1A, the headrest assembly 30 includes a headrest bun 32 having a downwardly extending lower portion 34. It is contemplated that the headrest assembly 30 is operable between extended and retracted positions relative to the seatback 2, as further described below. In FIG. 1A, the headrest assembly 30 is shown in the retracted position, wherein a portion of the downwardly extending lower portion 34 of the headrest bun 32 is received within the receiving area 16 of the seatback 2. In this way, the downwardly extending lower portion 34 of the headrest bun 32 does not protrude far from the front side 4 of the seatback 2, as a portion of the downwardly extending lower portion 34 of the headrest bun 32 is nested within the receiving area 16 of the seatback 2.

Figure 1B:
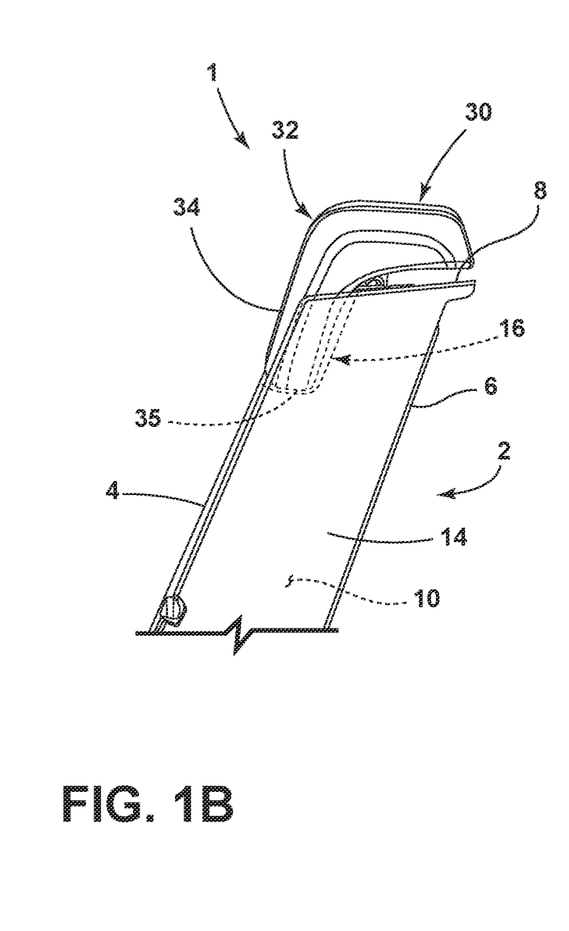
FIG. 1B is a fragmentary side elevation view of the seating assembly of FIG. 1A.

Referring now to FIG. 1B, a portion 35 of the downwardly extending lower portion 34 of the headrest bun 32 is shown received within the receiving area 16 of the seatback 2 with the headrest assembly 30 in the retracted position.

Figure 2A:
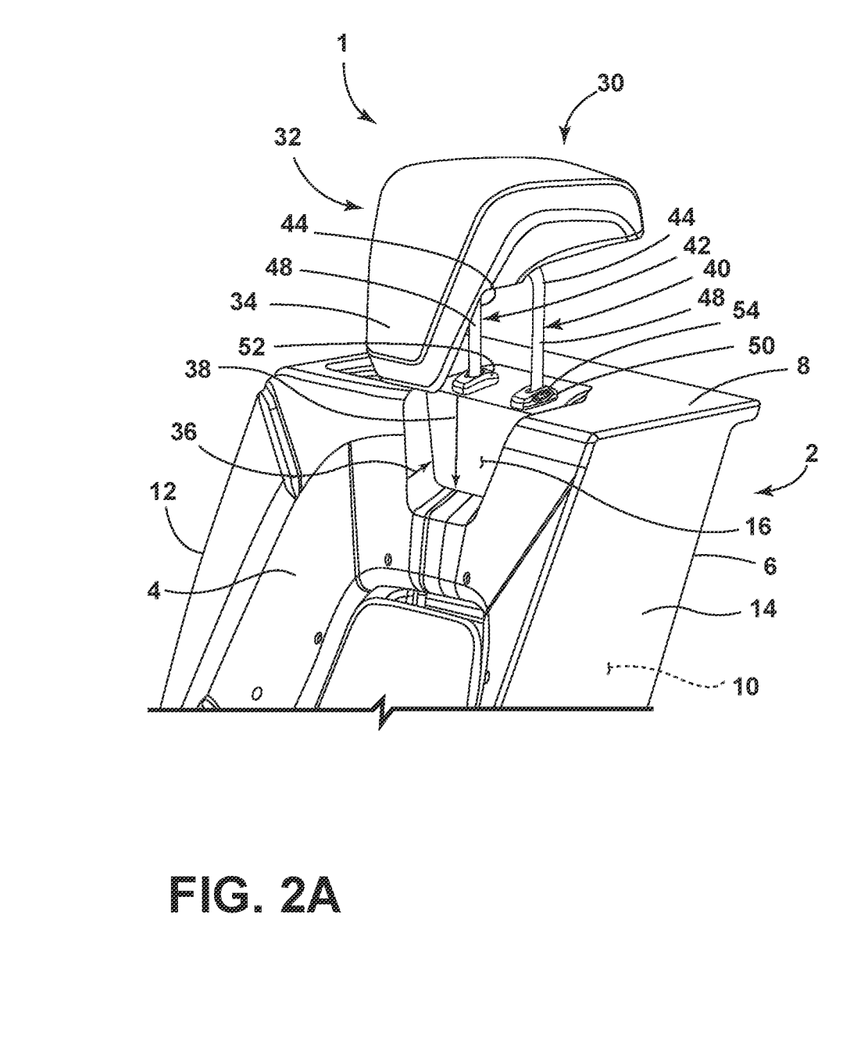
FIG. 2A is a fragmentary front perspective view of the seating assembly of FIG. 1A with the headrest assembly shown in an extended position.
Figure 2B:
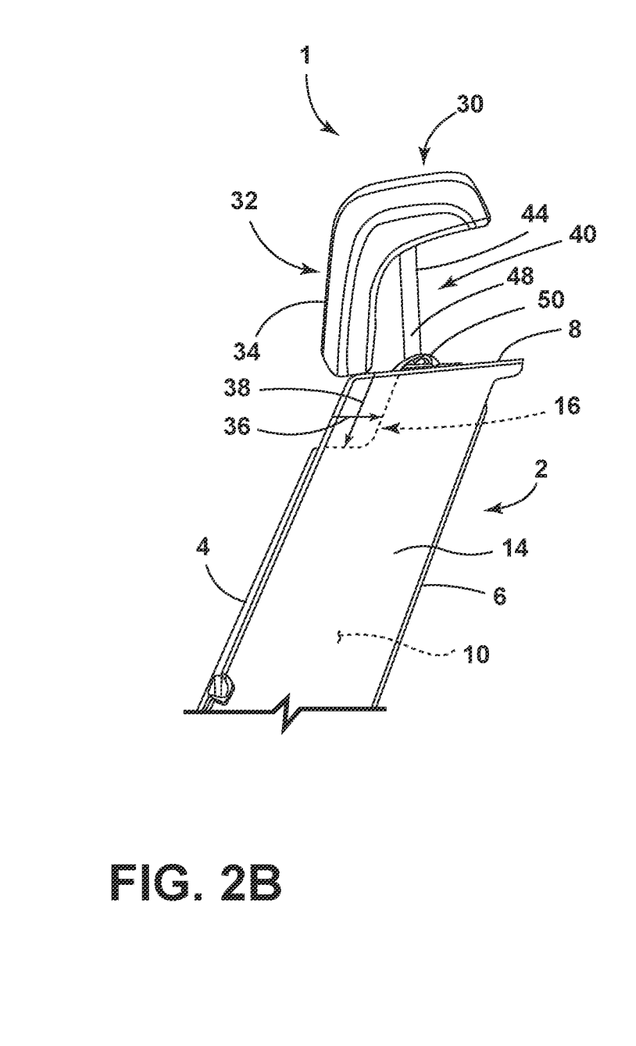
FIG. 2B is a fragmentary side elevation view of the seating assembly of FIG. 2A.

Referring now to FIGS. 2A and 2B, the seat assembly 1 is shown with the headrest assembly 30 in the extended position. Thus, the headrest assembly 30 is operable between the retracted position, shown in FIGS. 1A and 1B, in the extended position, shown in FIGS. 2A and 2B. In the extended position, the headrest assembly 30 has moved upward, such that the downwardly extending lower portion 34 of the headrest bun 32 is removed from the receiving area 16 of the seatback 2. With the downwardly extending lower portion 34 of the headrest bun 32 removed from the receiving area 16 of the seatback 2, the receiving area 16 is fully revealed. As shown in FIGS. 2A and 2B, the receiving area 16 extends inwardly from the front side 4 of the seatback 2 along the path as indicated by arrow 36. The receiving area 16 also extends downwardly from the upper side 8 of the seatback 2 along the path as indicated by arrow 38. Thus, the receiving area 16 extends into the interior portion 10 of the seatback 2.

As best shown in FIG. 2A, the headrest assembly 30 is supported by first and second support rods 40, 42. The first and second support rods 40, 42 each include upper portions 44 and lower portions 46 (FIGS. 4A, 4B) with body portions 48 disposed therebetween. The upper portions 44 of the first and second support rods 40, 42 are operably coupled to the headrest assembly 30 to support the same between the extended and retracted positions. It is contemplated that the first and second support rods 40, 42 may be individual support rods, or may be integrated parts of an inverted U-shaped support member for the headrest assembly 30.

First and second clip members 50, 52 are disposed on the upper side 8 of the seatback 2, and are configured to retain the headrest assembly 30 in the extended position, in a manner as known in the art. With specific reference to clip member 50, a release button 54 is provided to release the headrest assembly from engagement with the clip member 50, such that the headrest assembly 30 can be lowered from the extended position to the retracted position.

Figure 2C:
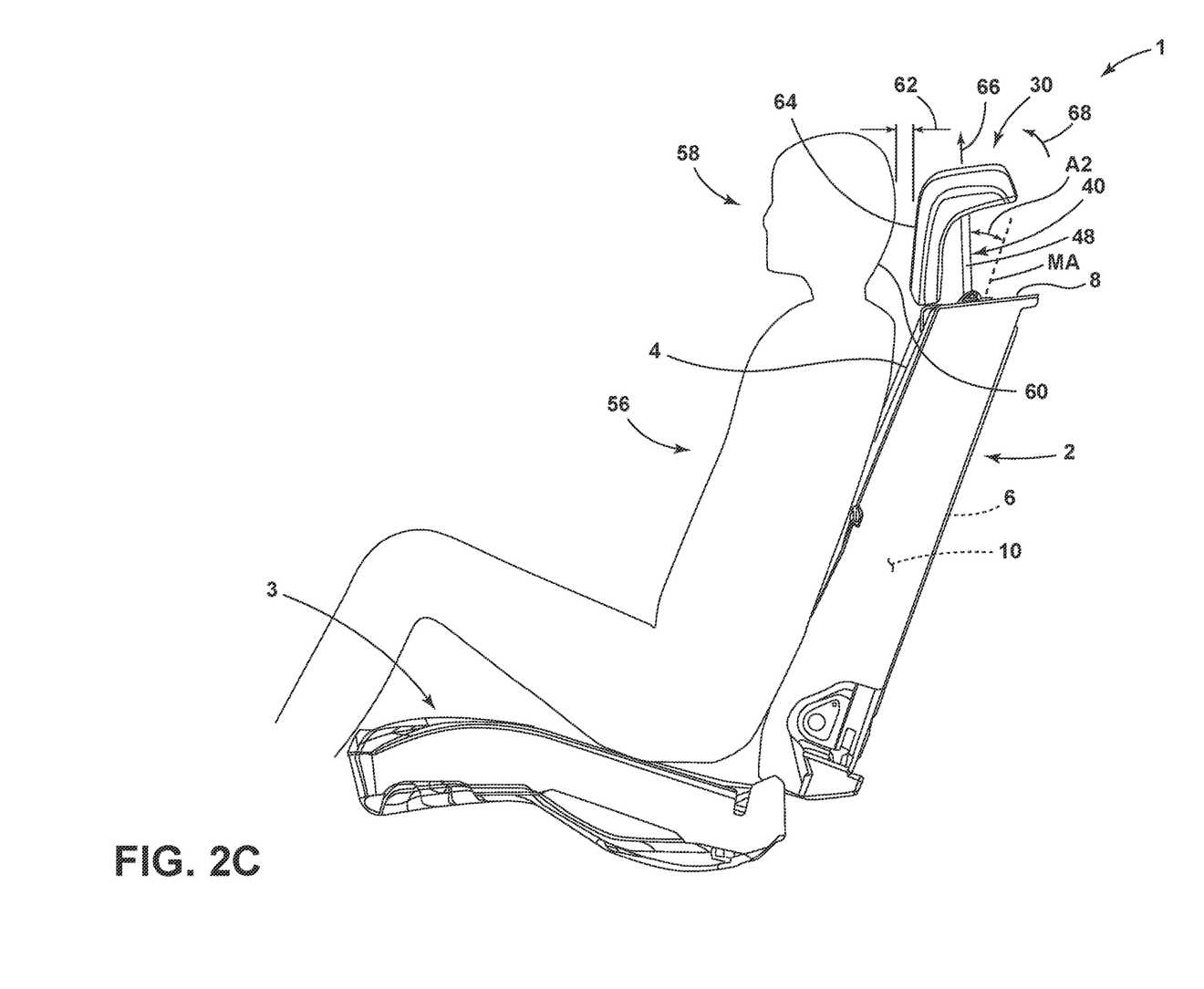
FIG. 2C is a side elevation view of the seating assembly of FIG. 2A with a seat occupant seated thereon.

Referring now to FIG. 2C, a seat occupant 56 is shown seated on a seat portion 3 of the seat assembly 1. The headrest assembly 30 is shown in the extended position adjacent a head 58 of the seat occupant 56. The headrest assembly 30 of the present concept is configured to decrease a spacing 62 between a front surface 64 of the headrest assembly 30 and a rear portion 60 of the head 58 of the seat occupant 56. Thus, the headrest assembly 30 of the present concept is configured to close the spacing 62 between the head 58 of the seat occupant 56 and the headrest assembly 30 when the headrest assembly 30 is in the extended position. To this end, the headrest assembly 30 of the present concept does not simply extend and retract in a linear manner, but rather moves in a vertical direction, as indicated by arrow 66 and also pivots in a forward direction, as indicated by arrow 68, as the headrest assembly 30 moves from the retracted position to the extended position.

Figure 3A:
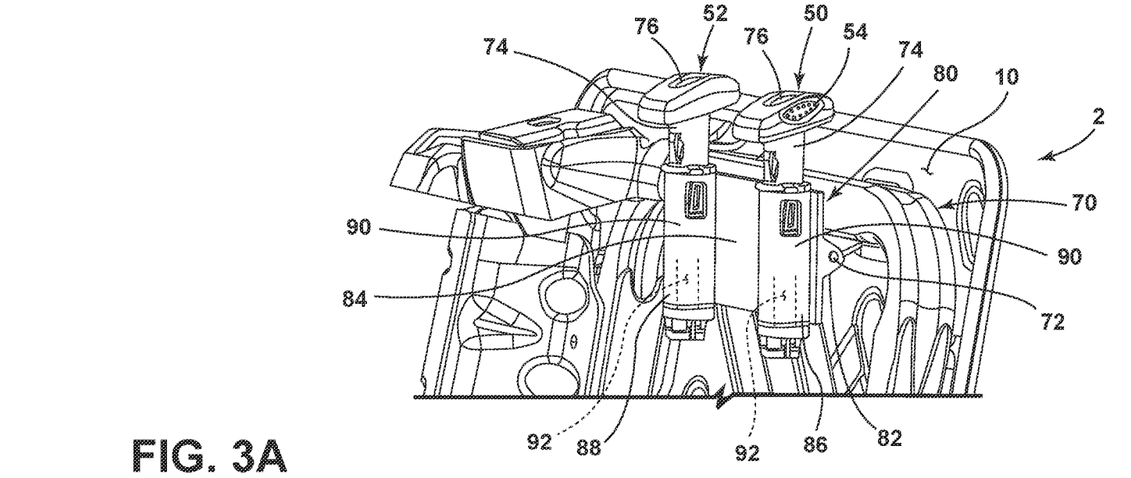
FIG. 3A is a fragmentary front perspective view of a frame assembly having a guide plate pivotally coupled thereto and positioned in a first position.
Figure 3B:
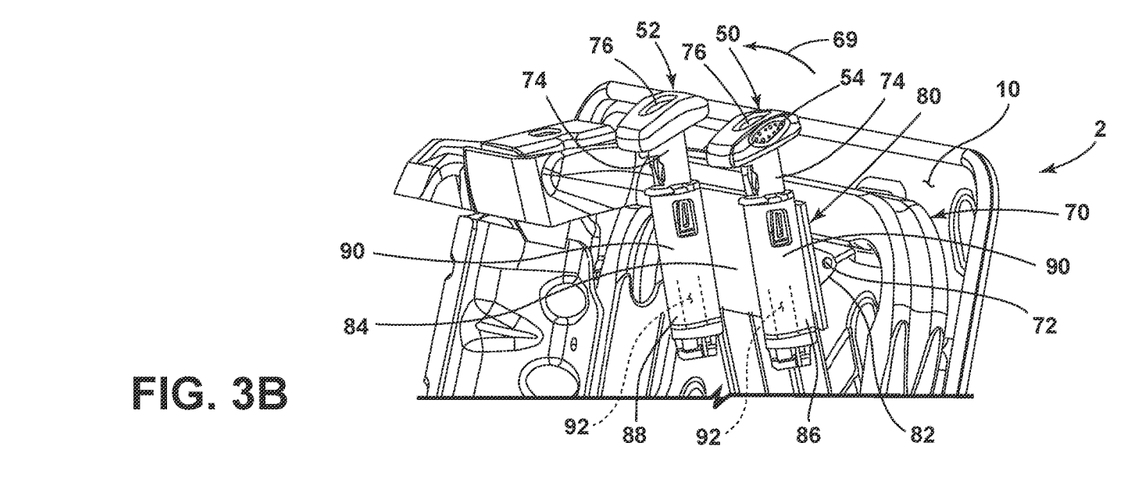
FIG. 3B is a fragmentary front perspective view of the frame assembly of FIG. 3A with the guide plate shown in a second position.

Referring now to FIGS. 3A and 3B, the seatback 2 is shown with cover and padding materials removed therefrom to reveal a frame assembly 70 positioned within the interior portion 10 of the seatback 2. A guide plate 80 is pivotally coupled to the frame assembly 70 between a first position, shown in FIG. 3A, and a second position, shown in FIG. 3B. The guide plate 80 moves from the first position to the second position along the rotational path as indicated by arrow 69. Movement of the guide plate 80 between the first and second positions is predicated on movement of the headrest assembly 30 between the retracted and extended positions, as further described below. In the embodiment shown in FIGS. 3A and 3B, the guide plate 80 is pivotally coupled to the frame assembly 70 at a pivot pin 72 is operably coupled to a rearwardly extending attachment portion 82 of the guide plate 80. It is contemplated that multiple rearwardly extending attachment portions may be included on the guide plate 80.

As further shown in FIGS. 3A and 3B, the guide plate 80 includes a front surface 84 having first and second sleeves 86, 88 disposed thereon. Each of the first and second sleeves 86, 88 includes an outer casing 90 with a receiving channel 92 disposed therethrough. Thus, it is contemplated that the receiving channels 92 of the first and second sleeves 86, 88 defined hollow interior portions of the first and second sleeves 86, 88. As further shown in FIGS. 3A and 3B, the first and second clip members 50, 52 include stem portions 74 that are received within the receiving channels 92 of the first and second sleeves 86, 88. The first and second clip members 50, 52 further include upper apertures 76 which are configured to slidably receive the body portions 48 of the first and second support rods 40, 42. Similarly, the body portions 48 of the first and second support rods 40, 42 are configured to be slidably received within the receiving channels 92 of the first and second sleeves 86, 88. In this way, the guide plate 80 is contemplated to be a vertically stationary member that pivots between the first and second positions shown in FIGS. 3A and 3B along the rotational path as indicated by arrow 69, as the body portions 48 of the first and second support rods 40, 42 move through the receiving channels 92 of the first and second sleeves 86, 88 of the guide plate 80.

Figure 4A:
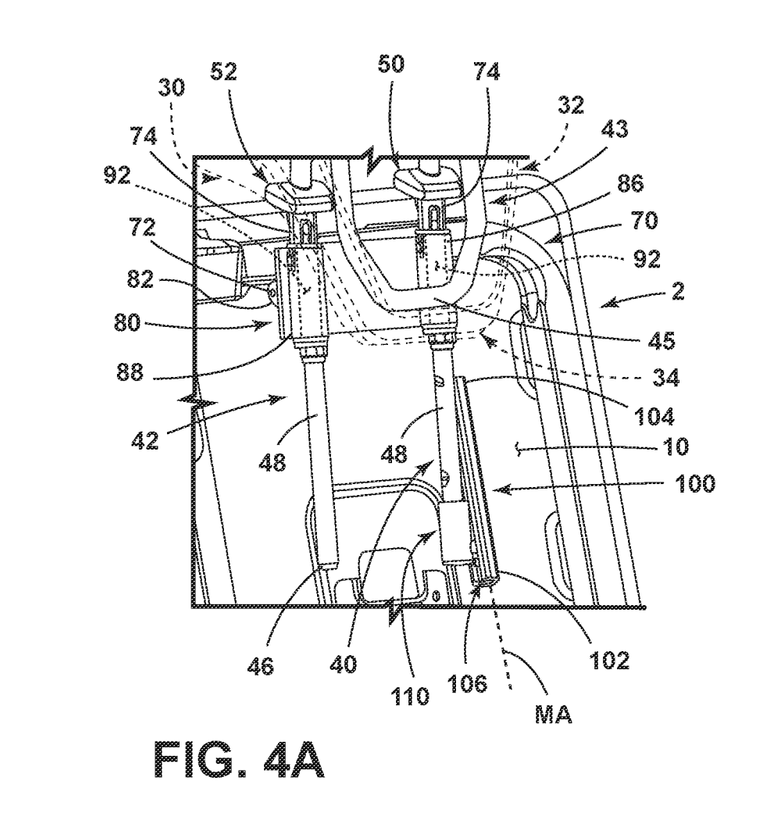
FIG. 4A is a fragmentary front perspective view of the frame assembly of FIG. 3A with the guide plate in the first position and coupled to first and second support rods shown in a lowered position.
Figure 4B:
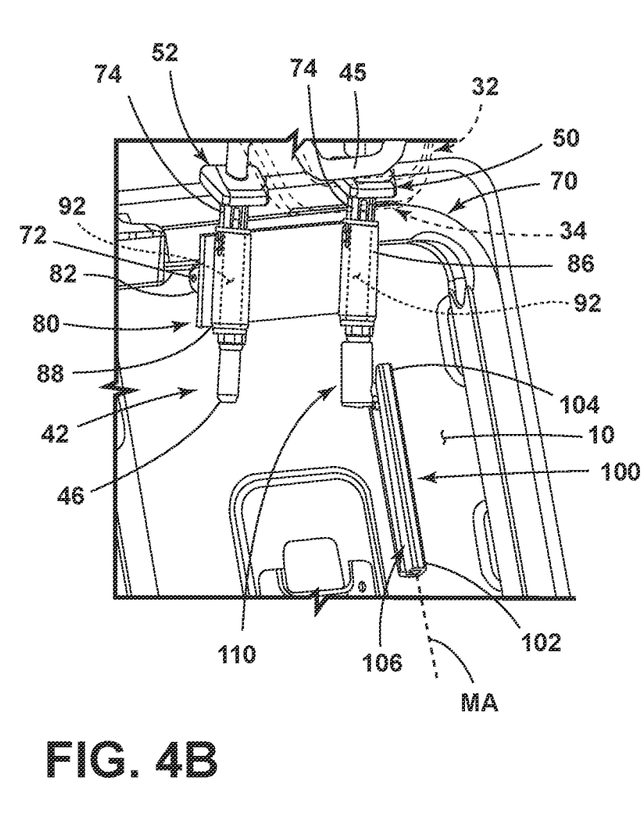
FIG. 4B is a fragmentary front perspective view of the frame assembly of FIG. 4A with the guide plate shown in a second position and the first and second support rods shown in a raised position.

Referring now to FIGS. 4A and 4B, the headrest assembly 30 is shown in phantom as coupled to the first and second support rods 40, 42. In the embodiment shown in FIGS. 4A, 4B, the first and second support rods 40, 42 are part of an integrated support member 43 which includes a downwardly extending portion 45 disposed within the downwardly extending lower portion 34 of the headrest bun 32. The body portions 48 of the first and second support rods 40, 42 are shown slidably disposed within the receiving channels 92 of the first and second sleeves 86, 88 and also slidably received through the stem portions 74 of the first and second clip members 50, 52. In this way, the body portions 48 of the first and second support rods 40, 42 are slideably coupled with the guide plate 80. In FIG. 4A, the headrest assembly 30 is in the retracted position, and the first and second support rods 40, 42 are in lowered positions. In FIG. 4B, the headrest assembly 30 is in the extended position, and the first and second support rods 40, 42 are in raised positions. In FIG. 4A, the guide plate 80 is in the first position. In FIG. 4B, the guide plate 80 is in the second position. Thus, the guide plate 80 rotates forward from the first position to the second position as the headrest assembly 30 moves from the retracted position to the extended position. Similarly, the guide plate 80 rotates forward from the first position to the second position as the first and second support rods 40, 42 move from the lowered positions to the raised positions.

Figure 5:
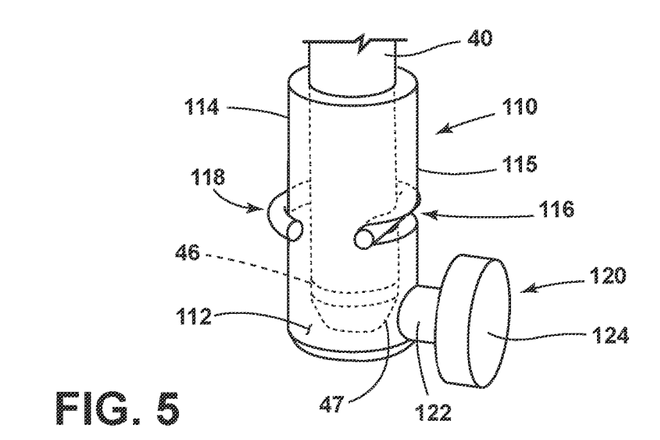
FIG. 5 is a perspective view of a lower portion of a support rod as coupled to a carriage member.

As further shown in the embodiment of FIGS. 4A and 4B, a track member 100 includes first and second ends 102, 104 with a channel 106 disposed along a length of the track member 100. The channel 106 is shown in FIGS. 4A and 4B as an inwardly opening channel. The track member 100 is mounted to the frame assembly 70 of the seatback 2 at a mounting angle MA. In FIGS. 4A and 4B, the lower portion 46 of the second support rod 42 is a free and that is not connected to the track member 100. The lower portion 46 of the first support rod 40 is shown in FIGS. 4A and 4B as being operably coupled to a carriage member 110, as best shown in FIG. 5. The carriage member 110 is further coupled to the track member 100 for movement between raised and lowered positions along the track member 100. In FIG. 4A, the carriage member 110 is in the lowered position, such that the carriage member 110 is disposed adjacent to the first end 102 of the track member 100. In FIG. 4B, the carriage member 110 is in the raised position, such that the carriage member 110 is disposed adjacent to the second end 104 of the track member 100. The carriage member 110 is contemplated to be slidably coupled to the channel 106 of the track member as the headrest assembly 30, and the first and second support rods 40, 42 thereof, moved between raised and lowered positions. The carriage member 110 is also contemplated to be pivotally coupled to the channel 106 of the track member 100 to accommodate forward rotational movement of the guide plate 80 and the first and second support rods 40, 42, as further described below. Thus, the guide plate 80 is in the first position when the carriage member 110 is in the lowered position. The guide plate 80 is rotated forward to the second position from the first position when the carriage member 110 moves from the lowered position to the raised position. It is contemplated that a second track member may be included to slidably and pivotally coupled to a carriage member associated with the lower portion 46 of the second support rod 42, such that dual carriage members and dual track members may be used with the raising and lowering of the headrest assembly 30 of the present concept.

Referring now to FIG. 5, the carriage member 110 includes a hollow interior cavity 112 that is surrounded by a body portion 114 in FIG. 5, the lower portion 46 of the first support rod 40 is received within the hollow interior cavity 112 of the carriage member 110. A relief portion 116 is disposed within the body portion 114 of the carriage member 110 and is configured to receive a spring clip 118 therein. As further shown in FIG. 5, the carriage member 110 includes an engagement member 120 extending outwardly from an outer surface 115 of the body portion 114. The engagement member 120 includes a stem portion 122 and a head portion 124. In the embodiment shown in FIG. 5, the head portion 124 is a circular member that has a width that is greater than the stem portion 122. In this way, the head portion 124 of the engagement member can be received within a T-shaped configuration of the channel 106 of the track member 100 for sliding and pivoting movement therealong.

Figure 6A:
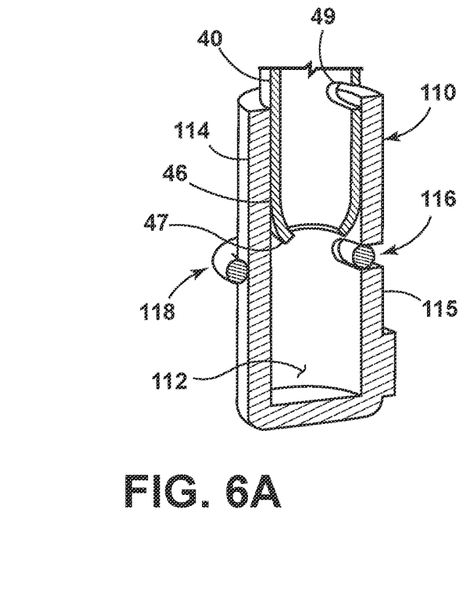
FIGS. 6A-6C are cross-sectional views of the a lower portion of a support rod being inserted into a hollow interior cavity of a carriage member.
Figure 6B:
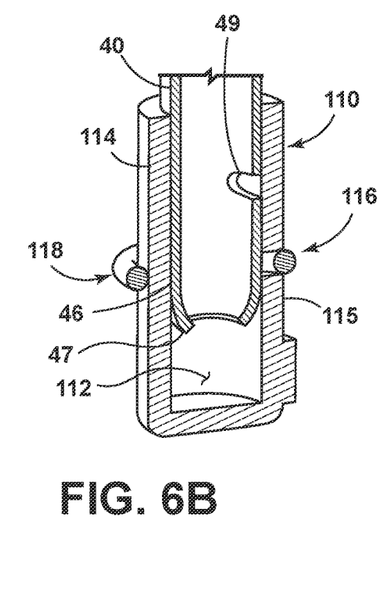
Figure 6C:
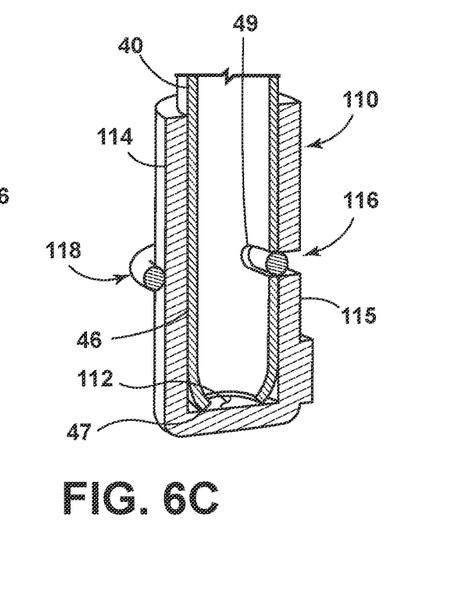

Referring now to FIGS. 6A-6C the lower portion 46 of the first support rod 40 includes a beveled distal end 47 that is inwardly tapered. The lower portion 46 of the first support rod 40 further includes a notch 49 disposed therein. As the beveled distal end 47 of the first support rod 40 approaches the spring clip 118 of the carriage member 110, the beveled distal end 47 urges the spring clip 118 out of the relief portion 116 of the carriage member 110, as best shown in FIG. 6B. When the notch 49 of the lower portion 46 of the first support rod 40 aligns with the relief portion 116 of the carriage member 110, as shown in FIG. 6C, the spring clip 118 engages both the relief portion 116 of the carriage member 110 and the notch 49 of the first support rod 40 to interconnect the two components for movement in concert between the raised and lowered positions along the track member 100, as described above.

Figure 7A:
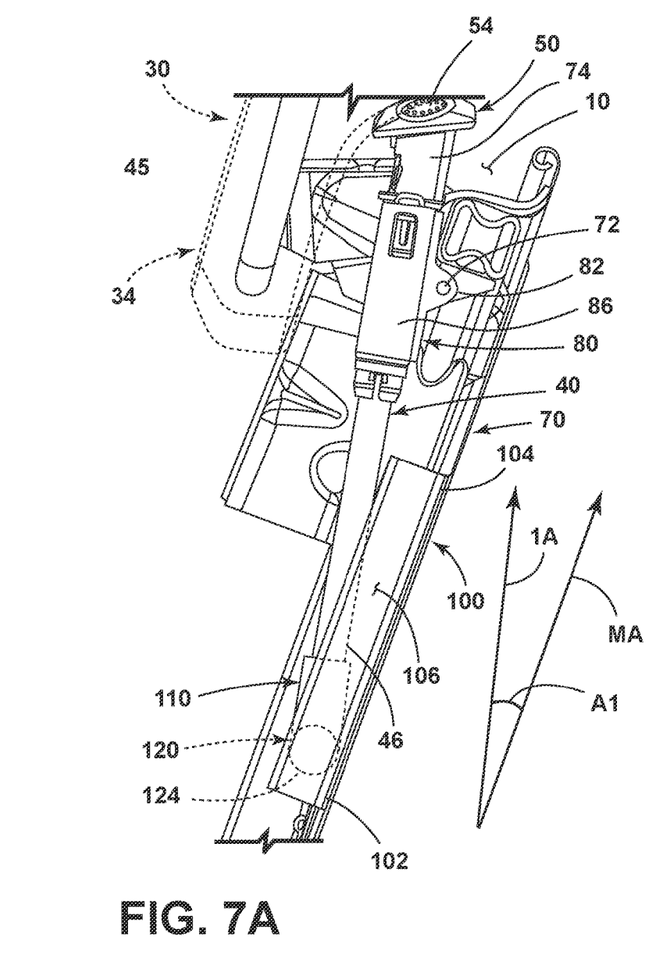
FIG. 7A is a fragmentary side elevation view of the frame assembly of FIG. 4A with the guide plate shown in the first position and the first and second support rods shown in a lowered position.
Figure 7B:
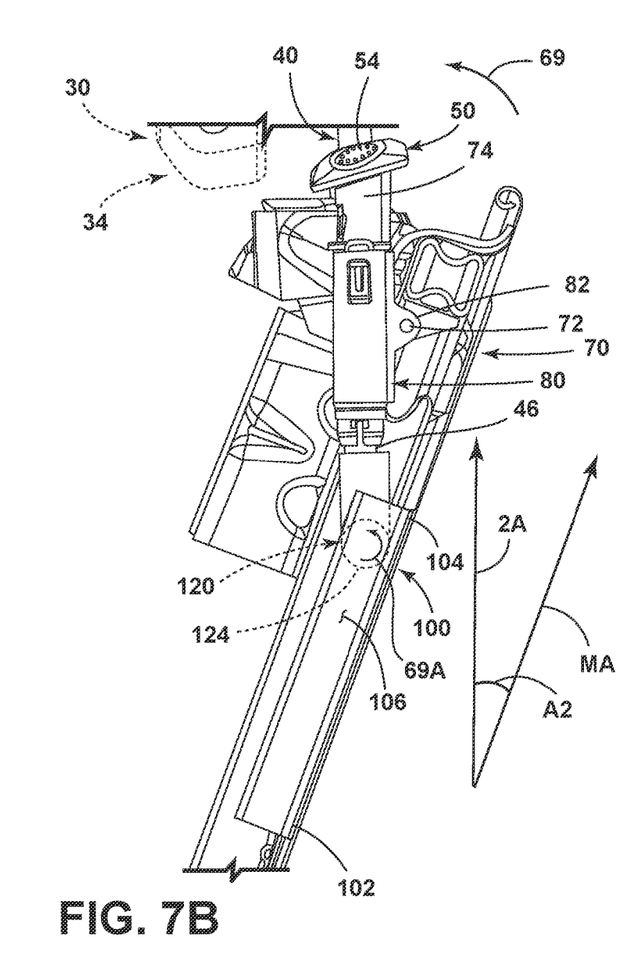
FIG. 7B is a fragmentary side elevation view of the frame assembly of FIG. 7A with the guide plate shown in the second position and the first and second support rods shown in the raised position.

Referring now to FIG. 7A, the carriage member 110 is in the lowered position, such that the carriage member 110 is disposed adjacent to the first end 102 of the track member 100. Similarly, the first support rod 40 is in the lowered position in FIG. 7A and disposed at a first angle 1A. Further, with the first support rod 40 and the carriage member 110 in the respective lowered positions, the headrest assembly 30 is in the retracted position. Accordingly, the guide plate 80 is in the first position in FIG. 7A. In FIG. 7B, the carriage member 110 is in the raised position, such that the carriage member 110 is disposed adjacent to the second end 104 of the track member 100. Similarly, the first support rod 40 is in the raised position in FIG. 7B and disposed at a second angle 2A. Further, with the first support rod 40 and the carriage member 110 in the respective raised positions, the headrest assembly 30 is in the extended position. Accordingly, the guide plate 80 has rotated from the first position, shown in FIG. 7A, to the second position along the forward rotational path as indicated by arrow 69 as the headrest assembly 30 is moved to the extended position from the retracted position.

In FIG. 7A, the first support rod 40 is disposed at the first angle 1A relative the mounting angle MA of the track member 100 due to the first support rod 40 being in the lowered position. In FIG. 7B, the first support rod 40 is disposed at the second angle 2A relative the mounting angle MA of the track member 100 due to the first support rod 40 being in the raised position. The difference between the second angle 2A of the first support rod 40 relative to the mounting angle MA of the track member 100 is greater than the difference between the first angle 1A relative to the mounting angle MA of the track member 100. Thus, the first support rod 40 pivots forward along the rotational path as indicated by arrow 69 from the first angle 1A to the second angle 2A as the first support rod 40 moves from the lowered position to the raised position. Thus, the first support rod 40 provides for a placement of the headrest assembly 30, as coupled thereto, that is closer to the head 58 of a seat occupant 56, as shown in FIG. 2C, by rotating from the first angle 1A to the second angle 2A in a forward rotational manner, then had the headrest assembly 30 been adjusted linearly. By adjusting the headrest assembly 30 both upwardly and with a forward rotation, the headrest assembly 30 extends forward from the first angle 1A to the second angle 2A. Typically, in a linear only actuation, the headrest assembly 30 would generally follow the mounting angle MA of the track member 100 and would not pivot forward. The angle defined between the first position of the first support rod 40 relative to the mounting angle MA of the track member 100 is identified as angle A1 (FIG. 7A), which is less than an angle A2 which defines the second position of the first support rod 40 relative to the mounting angle MA of the track member 100 (FIG. 7B).

As noted above, the carriage member 110 is slideably and pivotally coupled to the track member 100. Thus, the carriage member 110 rotates forward in the direction as indicated by arrow 69A as the carriage member 110 moves from the lowered position to the raised position.

According to a first aspect of the present disclosure, a seat assembly includes a seatback having an interior portion with a frame assembly disposed therein. A track member is operably coupled to the frame assembly and includes a channel disposed along the track member. A carriage member is slideably coupled to the channel of the track member between raised and lowered positions. The carriage member includes a hollow interior cavity. A guide plate is pivotally coupled to the frame assembly between first and second positions. The guide plate includes at least one sleeve having an outer casing with a receiving channel disposed therethrough. At least one support rod includes upper and lower portions with a body portion disposed therebetween. The lower portion is received in the hollow interior cavity of the carriage member for movement therewith. The body portion is slideably received in the receiving channel of the guide plate. A headrest assembly is supported on the upper portion of the at least one support rod. The headrest assembly is operable between extended and retracted positions.

Embodiments of the first aspect of the present disclosure can include any one or a combination of the following features:
  the carriage member includes an engagement member extending outwardly from the body portion of the carriage member;
  the engagement member is slideably and pivotally coupled to the channel of the track member for sliding and pivoting movement therealong;
  the channel is an inwardly opening channel;
  the guide plate is in the first position when the carriage member is in the lowered position;
  the guide plate is in the second position when the carriage member is in the raised position; and
  the guide plate rotates forward from the first position to the second position as the carriage member moves from the lowered position to the raised position.

According to a second aspect of the present disclosure, a seat assembly includes a seatback having an interior portion with a frame assembly disposed therein. A track member is operably coupled to the frame assembly. A carriage member is pivotally and slideably coupled to the track member between raised and lowered positions. At least one support rod includes upper and lower portions. The lower portion is operably coupled to the carriage member for movement therewith. A headrest assembly is supported on the upper portion of the at least one support rod, and is operable between extended and retracted positions.

Embodiments of the second aspect of the present disclosure can include any one or a combination of the following features:
  the headrest assembly includes a headrest bun with a downwardly extending lower portion;
  the seatback includes a front side and an upper side, and a receiving area extends inwardly from the front side of the seatback and extends downwardly from the upper side of the seatback;
  a portion of the downwardly extending lower portion is received in the receiving area when the headrest assembly is in the retracted position;
  a guide plate is pivotally coupled to the frame assembly between first and second positions. The guide plate includes at least one sleeve with a receiving channel disposed therethrough, and a body portion of the at least one support rod is slideably received through the receiving channel of the guide plate;
  the guide plate is in the first position when the carriage member is in the lowered position;
  the guide plate is in the second position when the carriage member is in the raised position; and
  the guide plate rotates forward from the first position to the second position as the carriage member moves from the lowered position to the raised position.

According to a third aspect of the present disclosure, a seat assembly includes a seatback having an interior portion with a frame assembly disposed therein. A track member is operably coupled to the frame assembly at a mounting angle. A support rod includes upper and lower portions. The lower portion is operably coupled to the track member for movement between raised and lowered positions. The support rod is disposed at a first angle relative to the mounting angle of the track member when the support rod is in the lowered position. The support rod is disposed at a second angle relative to the mounting angle of the track member when the support rod is in the raised position. The second angle is greater than the first angle.

Embodiments of the third aspect of the present disclosure can include any one or a combination of the following features:
- a guide plate is pivotally coupled to the frame assembly between first and second positions, and the support rod is slideably coupled to the guide plate;
- the guide plate is in the first position when the support rod is in the lowered position, and the guide plate rotates forward to the second position as the support rod moves from the lowered position to the raised position;
- the support rod pivots forward from the first angle to the second angle as the support rod moves from the lowered position to the raised position; and
- a headrest assembly is supported on the upper portion of the support rod, and is operable between extended and retracted positions.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly, comprising:
   a seatback having an interior portion with a frame assembly disposed therein;
   a track member operably coupled to the frame assembly and having a channel disposed along the track member;
   a carriage member slideably coupled to the channel of the track member between raised and lowered positions, wherein the carriage member includes a hollow interior cavity;
   a guide plate pivotally coupled to the frame assembly between first and second positions, wherein the guide plate includes at least one sleeve having an outer casing with a receiving channel disposed therethrough;
   at least one support rod having upper and lower portions with a body portion disposed therebetween, wherein the lower portion is received in the hollow interior cavity of the carriage member for movement therewith, and further wherein the body portion is slideably received in the receiving channel of the guide plate; and
   a headrest assembly supported on the upper portion of the at least one support rod, wherein the headrest assembly is operable between extended and retracted positions.

2. The seat assembly of claim 1, wherein the carriage member includes an engagement member extending outwardly from the body portion of the carriage member.

3. The seat assembly of claim 2, wherein the engagement member is slideably and pivotally coupled to the channel of the track member for sliding and pivoting movement therealong.

4. The seat assembly of claim 2, wherein the channel is an inwardly opening channel.

5. The seat assembly of claim 1, wherein the guide plate is in the first position when the carriage member is in the lowered position.

6. The seat assembly of claim 5, wherein the guide plate is in the second position when the carriage member is in the raised position.

7. The seat assembly of claim 6, wherein the guide plate rotates forward from the first position to the second position as the carriage member moves from the lowered position to the raised position.

8. A seat assembly, comprising:
   a seatback having an interior portion with a frame assembly disposed therein;
   a track member operably coupled to the frame assembly;
   a carriage member pivotally and slideably coupled to the track member between raised and lowered positions;
   at least one support rod having upper and lower portions, wherein the lower portion is operably coupled to the carriage member for movement therewith; and
   a headrest assembly supported on the upper portion of the at least one support rod, wherein the headrest assembly is operable between extended and retracted positions.

9. The seat assembly of claim 8, wherein the headrest assembly includes a headrest bun with a downwardly extending lower portion.

10. The seat assembly of claim 9, wherein the seatback includes a front side and an upper side, and further wherein a receiving area extends inwardly from the front side of the seatback and extends downwardly from the upper side of the seatback.

11. The seat assembly of claim 10, wherein a portion of the downwardly extending lower portion is received in the receiving area when the headrest assembly is in the retracted position.

12. The seat assembly of claim 8, including:
   a guide plate pivotally coupled to the frame assembly between first and second positions, wherein the guide plate includes at least one sleeve with a receiving channel disposed therethrough, and further wherein a body portion of the at least one support rod is slideably received through the receiving channel.

13. The seat assembly of claim 12, wherein the guide plate is in the first position when the carriage member is in the lowered position.

14. The seat assembly of claim 13, wherein the guide plate is in the second position when the carriage member is in the raised position.

15. The seat assembly of claim 14, wherein the guide plate rotates forward from the first position to the second position as the carriage member moves from the lowered position to the raised position.

16. A seat assembly, comprising:
   a seatback having an interior portion with a frame assembly disposed therein;
   a track member operably coupled to the frame assembly at a mounting angle; and
   a support rod having upper and lower portions, wherein the lower portion is operably coupled to the track member for movement between raised and lowered positions, and further wherein the support rod is disposed at a first angle relative to the mounting angle of the track member when the support rod is in the lowered position, and further wherein the support rod is disposed at a second angle relative to the mounting angle of the track member when the support rod is in the raised position, wherein the second angle is greater than the first angle.

17. The seat assembly of claim 16, including:
a guide plate pivotally coupled to the frame assembly between first and second positions, wherein the support rod is slideably coupled to the guide plate.

18. The seat assembly of claim 17, wherein the guide plate is in the first position when the support rod is in the lowered position, and further wherein the guide plate rotates forward to the second position as the support rod moves from the lowered position to the raised position.

19. The seat assembly of claim 16, wherein the support rod pivots forward from the first angle to the second angle as the support rod moves from the lowered position to the raised position.

20. The seat assembly of claim 19, including:
a headrest assembly supported on the upper portion of the support rod, wherein the headrest assembly is operable between extended and retracted positions.

\* \* \* \* \*